Figure 3:
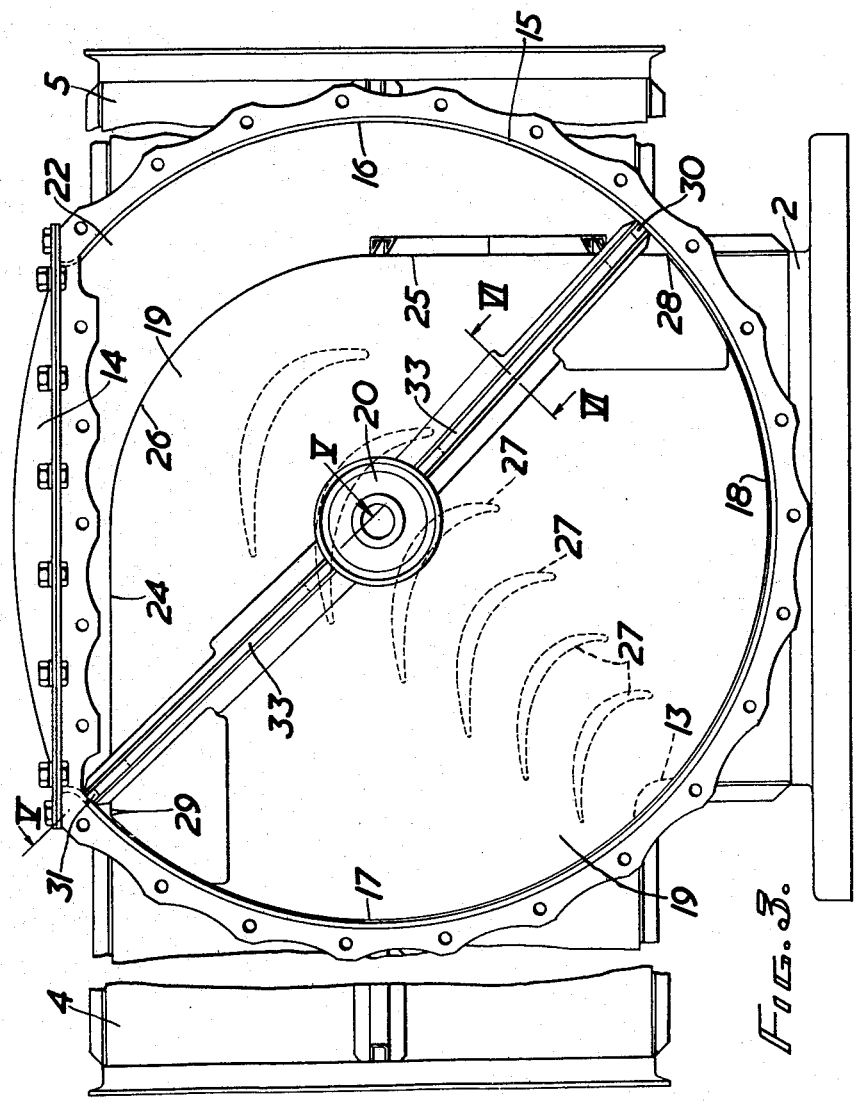

May 29, 1956  S. H. A. MAGIN  2,747,364
TWO-WAY ROTARY FLUID VALVE
Filed June 11, 1954  3 Sheets-Sheet 1
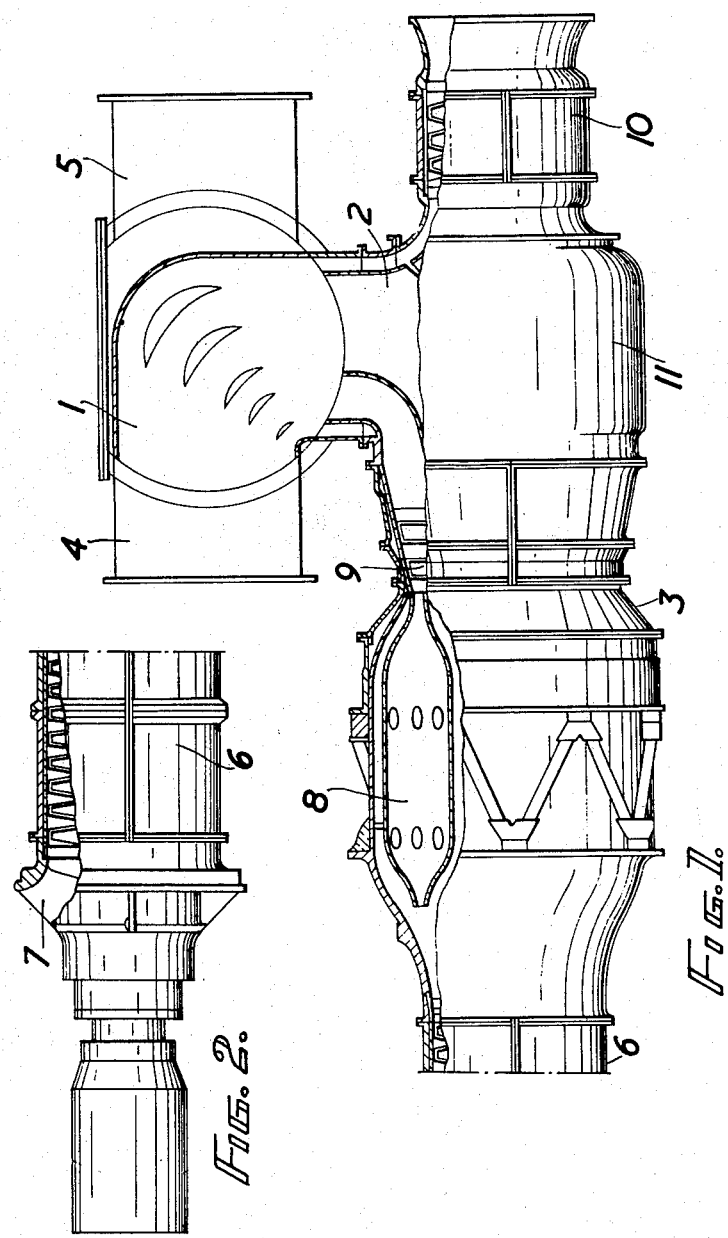
INVENTOR
Sidney H. A. Magin
BY Watson, Cole, Grindle & Watson
ATTORNEYS

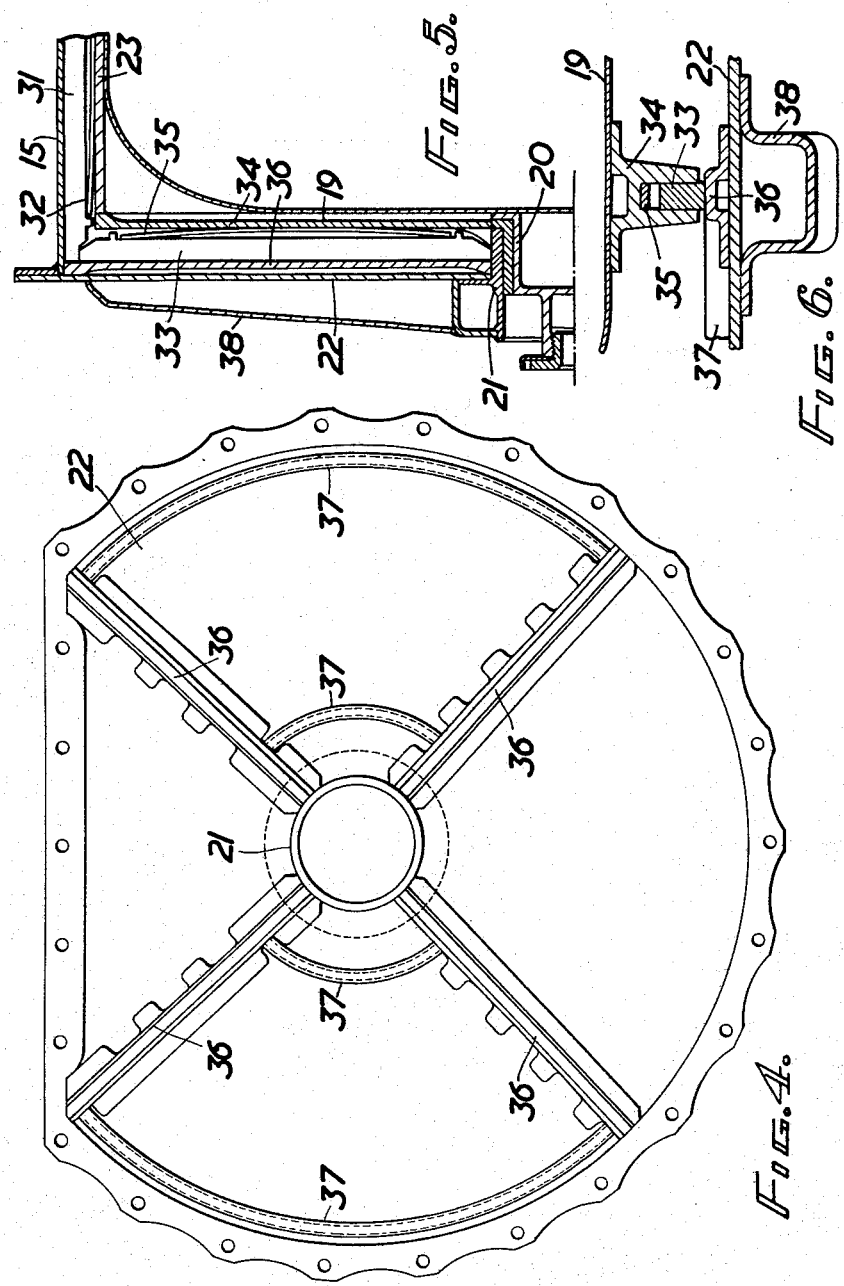

United States Patent Office 2,747,364
Patented May 29, 1956

2,747,364

TWO-WAY ROTARY FLUID VALVE

Sidney Henry Albert Magin, Crouch End, London, England, assignor to D. Napier & Son Limited, London, England, a company of Great Britain Application June 11, 1954, Serial No. 436,181

4 Claims. (Cl. 60—39.07)

This invention relates to two-way valves of the rotary type comprising a valve chamber provided with three ports and a rotary valve member within the chamber arranged to direct the flow of a fluid through the valve. The invention is particularly concerned with "distributor" valves of this type having one inlet and two outlet ports, but it may also be applied to "mixing" valves having two inlet and one outlet ports, the function of the ports being reversed. For convenience however in the following specification and claims the valve is referred to as having one inlet and two outlet ports.

It is an object of the invention to provide an improved two-way rotary valve of the type referred to which will reduce or obviate any throttling effects during movement of the rotary valve member from one operative position to another, and it is a further object of the invention to provide a valve suitable for high velocity gas flow, particularly at elevated temperatures.

According to one aspect of the present invention a two-way rotary valve of the type referred to includes a cylindrical valve chamber having three closely spaced ports in its circumferential wall, of which the intermediate port is an inlet port and the other two outlet ports, and a rotary valve member in the chamber having a transfer passage therein, the two ends of which in one limiting position communicate respectively with the inlet port and one outlet port, while in another limiting position they communicate respectively with the inlet port and the other outlet port, while in an intermediate position each end of the passage communicates partly with the inlet port and partly with the adjacent outlet port.

Thus according to another aspect of the invention a two-way rotary valve of the type referred to includes an inlet port and two outlet ports communicating with a cylindrical valve chamber in which is housed a rotary valve member having a transfer passage or space arranged by movements of the valve to direct fluid from the inlet port to one or other or both of the outlet ports, the outlet ports being arranged circumferentially closely adjacent to the inlet port, such that the circumferential distance between adjacent edges of the outlet ports is substantially less than the overall circumferential distance between the remote edges of the opposite ends of the transfer passage in the rotary valve member, while the circumferential length of the minor sector (if any) of the rotary valve member is substantially less than the circumferential width of the inlet port, so that the total flow of fluid through the valve is not appreciably restricted during the changeover operation from one outlet port to the other.

Preferably the circumferential distance between the adjacent edges of the inlet port and each outlet port is considerably less than the circumferential width of the inlet port, and the overall circumferential distance between the remote edges of the opposite ends of the transfer passage in the rotary valve member is approximately twice the circumferential width of the inlet port.

When the valve is used to control high velocity gas streams the rotary valve member is preferably provided with one or more curved guide blades of aerofoil section to assist in the transfer of gas through the valve without undue turbulence.

Moreover when the valve is used with gases at elevated temperatures difficulties arise due to thermal expansion of the parts of the valve. According to another preferred feature of the invention therefore the rotary valve member is formed as a relatively loose fit within the valve chamber and is provided with sealing members or flanges on its external surfaces arranged to form substantially gas-tight seals with co-operating parts of the valve chamber in the two operative positions of the valve. These sealing members may in some cases be resiliently urged against the adjacent walls of the casing.

Valves according to the invention are particularly applicable for use in the ducting between a power gas producer and a gas absorber, when the gas producer is such that large throttling effects are undesirable. According to another aspect of the invention therefore a gas ducting system interposed between a gas producer of the gas turbine type and a gas absorber such as a propulsion jet nozzle, includes a two way valve as specified above, arranged to direct the flow of gas either to the gas absorber or to exhaust.

The invention may be performed in various different ways, but one specific embodiment as applied to the gas ducting of a jet propelled helicopter will now be described by way of example with reference to the accompanying drawings, in which:

Figures 1 and 2 constitute a divided side elevation (partly in section) of a gas-turbine type gas producer, including ducting for the power gas, and a two-way valve arranged in this ducting, Figure 3 is an enlarged side elevation of the two-way valve and associated ducting, with one side wall of the valve chamber removed, to show the side of the rotary valve member, Figure 4 is an enlarged side elevation of one of the side walls of the valve chamber, Figure 5 is a sectional view on the line V—V of Figure 3, showing one of the sealing devices, and Figure 6 is a sectional view on the line VI—VI of Figure 3.

In this example the two-way valve 1 is arranged in the hot gas duct 2 leading from a gas producer unit indicated generally at 3 and which may be of the kind described in copending application Serial No. 428,323 in a jet propelled helicopter. The valve is arranged in one position to direct the flow of hot gas towards a duct 4 leading to the helicopter rotor (not shown) and in another position to direct the hot gas to an exhaust duct 5, or to a straight propulsion jet nozzle.

The gas producer unit includes a first compressor 6, to which air is admitted through an air intake 7, a series of combustion chambers 8 in which fuel is burnt with the air compressed by the compressor 6, and a turbine 9 to which the products of combustion are directed. The turbine 9 is mechanically coupled to drive the compressor 6, and a second air compressor 10 arranged coaxially therewith, and also driven by the turbine, is arranged to deliver air into a ducting system 11, which also receives the exhaust gases from the turbine 9. The resultant power gas issues from the ducting 11 through the duct 2 in the form of a relatively hot "core" of exhaust gases surrounded by a "sheath" of relatively cool compressed air derived from the second compressor 10. Details of the ducting system 11 are given in copending patent application Serial No. 428,323.

Since the gas producer is of the gas turbine type any substantial throttling effect is clearly undesirable during operation of the turbine and a principal requirement of a valve in such an application therefore is that it should exhibit substantial non-throttling properties and should moreover be capable of operating at elevated temperatures.

As best seen in Figures 3, 4, 5 and 6 the valve comprises a part cylindrical valve chamber 15 having outlet ports 16 and 17 of generally rectangular cross-section arranged diametrically opposite to one another, each subtending an angle of approximately 80° at the axis of the chamber. The valve chamber is provided also with an inlet port 18 situated between the two outlet ports and having approximately the same circumferential width. The three ports are very closely spaced circumferentially from one another, and in the present example are angularly spaced by an angle of about 10°. Each port is of generally square or rectangular cross-section, but the ports 4 and 5 merge into circular section ducts. The upper part of the cylindrical valve chamber 15 is closed by an approximately flat plate 14, so as to reduce the overall vertical dimensions of the valve.

A rotary valve member is pivotally mounted within the valve chamber, and comprises two side plates 19 each secured to a trunnion 20 mounted in bearings 21 in the opposite side walls 22 of the valve chamber, the two side plates 19 being secured to opposite edges of a back wall 23 which is formed from sheet metal having two flat plane portions 24, 25 substantially at right angles to one another joined by a cylindrical curved portion 26 which subtends an angle of approximately 90° at the pivotal axis of the rotary member. The rotary valve member also includes a small front wall 13 also of sheet metal in the shape of the surface of a 90° segment of a right circular cylinder of small radius located between the side plates 19 diametrically opposite the curved portion 26 of the back wall, the curvature being in the same direction as that of the back wall. The front wall, which constitutes the minor sector of the valve, subtends an angle at the pivotal axis of the rotary member of 10°. In some case this front wall may be omitted. A series of curved streamlined guide blades 27 are secured between the side walls 19, their direction of curvature corresponding to the curvature of the back wall 23. The length and width of the guide blades 27 increase progressively from the smallest blade to the largest blade adjacent the back wall, and each guide blade may be designed to provide a minimum of turbulence and the greatest guiding efficiency when the rotary valve member is as shown in Figure 3 in its operative position to direct the flow of hot gas towards the duct 4 leading to the helicopter rotor. Thus in the other operative position of the valve where the hot gas is directed to the exhaust duct 5, the efficiency of the guide blades will not constitute such a critical factor. Alternatively the guide blades may be substantially symmetrical to provide equal efficiency in both operative positions.

The front and back walls 13 and 23 of the rotary valve member are so designed and dimensioned that in one position of the valve the front wall 13 of the valve member spans the small circumferential gap between one side of the inlet port 18 and the adjacent side of one of the outlet ports 16, 17, while the two end edges 28, 29 of the back wall are circumferentially spaced by a distance equal to the sum of twice the circumferential width of any one port 16, 17, or 18 together with the circumferential width of the gap between adjacent ports. It will be seen therefore that in all intermediate positions of the rotary valve member the combined circumferential width of the two apertures formed by the valve and leading to the two outlet ports 16 and 17, is substantially constant and equal to the circumferential width of the inlet port 18. Any throttling effect due to restriction of the passage-way through the valve is thus minimized.

Owing to the high temperatures at which the valve is required to operate the rotary valve member is constructed as a relatively loose fit within the valve chamber 15 and a gas seal is provided by two longitudinal sealing flanges 30, 31, parallel to its axis of rotation mounted in grooves in the back wall 23 of the rotary valve member and arranged to engage with the internal surface of the cylindrical side wall of the valve chamber 15. These sealing flanges are resiliently urged into close contact with wall of the valve chamber by means of leaf springs 32, as best seen in Figure 5. The gas seal between the rotary valve member and the valve chamber also includes a pair of radially arranged sealing members 33 mounted in groove guides 34 on the outer faces of the two side plates 19 of the rotary valve member, and resiliently urged towards the adjacent faces of the respective side walls 22 of the valve chamber by means of leaf springs 35. The inner faces of the side walls 22 are provided each with four raised sealing surfaces 36, which are machined accurately flat and are so disposed angularly as to cooperate with the sealing members 33 when the rotary valve member is in one or other of its two operative positions. Pairs of arcuate slides 37 are arranged between the sealing surfaces 36, to engage the sealing members 33 during movement of the valve member from one position to the other. The outer faces of the side walls 22 are reinforced in way of the sealing surfaces 36 by means of radial box-type reinforcement members 38.

The operation of the valve is effected by means of mechanism (not shown) attached to one of the trunnions 20 of the rotary valve member which projects through the side walls 22 of the valve chamber.

What I claim as my invention and desire to secure by Letters Patent is:

1. A two-way rotary fluid valve comprising a cylindrical valve chamber formed with three closely spaced ports in its circumferential wall, and a rotary valve member mounted for rotation within the chamber and having a transfer passage therein directing the flow of fluid through the valve, the circumferential distance between adjacent parts of the two remote ports being substantially less than the overall circumferential distance between the remote sides of the opposite ends of the transfer passage in the rotary valve member, while the circumferential distance between the adjacent sides of the opposite ends of the transfer passage is substantially less than the circumferential width of the intermediate port, thus maintaining a fluid path of substantial cross-sectional area through the valve at all positions of the rotary valve member.

2. A two-way rotary fluid valve as claimed in claim 1 in which the circumferential distance between the adjacent sides of the intermediate port and the respective side port is considerably less than the circumferential width of the intermediate port and the overall circumferential distance between the remote sides of the opposite ends of the transfer passage in the rotary valve member is approximately twice the circumferential width of the intermediate port.

3. A two-way rotary fluid valve as claimed in claim 1 in which the rotary valve member is provided with at least one curved guide blade to assist the flow of fluid through the transfer passage with a minimum of turbulence.

4. A gas producer comprising an air compressor, a combustion chamber to which air is delivered from the compressor, means for delivering fuel to the combustion chamber, a turbine driven by the products of combustion from the combustion chamber and arranged to drive the compressor, a duct leading from the outlet side of said turbine, a two-way rotary fluid valve in said duct, said valve comprising a cylindrical valve chamber having three closely spaced ports in its circumferential wall of which the intermediate port is an inlet port communicating with said duct and the other two outlet ports, a power gas duct leading from one of said outlet ports, an exhaust duct communicating directly with the atmosphere and with the other of said outlet ports, and a rotary valve member mounted within said valve chamber and formed with a transfer passage the two ends of which in one limiting position of the rotary valve member communicate respectively with the inlet port and with the outlet port connected to the power absorber, while in another limiting position they communicate respectively with the inlet port and the exhaust outlet port and in all intermediate positions the transfer passage maintains communication between the inlet port and at least one of the outlet ports, so providing a passage for the flow of exhaust gases at all positions of the valve.

References Cited in the file of this patent

UNITED STATES PATENTS

| 182,672 | Howell | Sept. 26, 1876 |
| 1,164,787 | Cutter | Dec. 21, 1915 |
| 1,215,819 | Kuehn | Feb. 13, 1917 |
| 2,677,932 | Forsling | May 11, 1954 |